United States Patent
Lyle

(10) Patent No.: US 7,349,924 B2
(45) Date of Patent: Mar. 25, 2008

(54) COLLOQUIUM PROSE INTERPRETER FOR COLLABORATIVE ELECTRONIC COMMUNICATION

(75) Inventor: Ruthie D. Lyle, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/998,773

(22) Filed: Nov. 29, 2004

(65) Prior Publication Data

US 2006/0117062 A1    Jun. 1, 2006

(51) Int. Cl.
*G06F 7/00* (2006.01)
(52) U.S. Cl. .................... 707/104.1; 707/1; 707/6; 704/4; 704/5; 704/7; 704/9; 715/531; 715/532; 715/533
(58) Field of Classification Search ............. 707/1, 707/3, 6, 104.1; 715/531, 532, 533; 704/9, 704/10, 4, 5, 7
See application file for complete search history.

(56) References Cited

U.S. PATENT DOCUMENTS

| | | |
|---|---|---|
| 5,644,774 A | 7/1997 | Fukumochi et al. |
| 5,842,159 A | 11/1998 | Nakamura et al. |
| 6,044,220 A | 3/2000 | Breternitz, Jr. |
| 6,278,967 B1 | 8/2001 | Akers et al. |
| 6,385,568 B1 | 5/2002 | Brandon et al. |
| 6,408,266 B1 | 6/2002 | Oon |
| 6,438,515 B1 | 8/2002 | Crawford et al. |
| 6,453,280 B1 | 9/2002 | Yang |
| 2002/0128814 A1 | 9/2002 | Brandon et al. |
| 2002/0128845 A1 | 9/2002 | Thomas et al. |
| 2003/0236658 A1 | 12/2003 | Yam |
| 2004/0030540 A1 | 2/2004 | Ovil et al. |

*Primary Examiner*—Hung Q Pham
(74) *Attorney, Agent, or Firm*—Stephen T. Keohane, Esq.; Steven M. Greenberg, Esq.; Carey Rodriguez Greenberg & Paul LLP

(57) ABSTRACT

A method, system and apparatus for processing colloquialisms in message text. A method of processing colloquialisms in message text can include detecting a colloquialism in message text, locating a universal form for the detected colloquialism, and transmitting the message text with the universal form to a designated message recipient. The transmitting step can include replacing the colloquialism with the universal form, and transmitting the message text with the universal form to a designated message recipient. Alternatively, the transmitting step can include supplementing the colloquialism with the universal form, and transmitting the message text with the universal form to a designated message recipient.

2 Claims, 2 Drawing Sheets

COLLOQUIUM PROSE INTERPRETER FOR COLLABORATIVE ELECTRONIC COMMUNICATION

BACKGROUND OF THE INVENTION

1. Statement of the Technical Field

The present invention relates to collaborative computing and more particularly to the exchange of message content containing colloquialisms in a collaborative environment.

2. Description of the Related Art

Electronic mail delivery systems represent the most widely used application in the world today. Electronic mail (e-mail) represents a giant leap forward in respect to global interpersonal communications in that prior to electronic mail, individuals primarily communicated via telephone, facsimile and post. In consequence of the widespread use of e-mail, individuals now expect near instant delivery of text, and even imagery, audio and video, without incurring the delay typical of the postal system, or the expense associated with telephony and fax technologies.

The recent rapid development of the Internet has led to advanced modes of communication which surpass that of e-mail. Using the Internet as a backbone, individuals worldwide can converge in real-time in cyberspace to share ideas, documents and images in a manner not previously possible through conventional telephony and video conferencing. To facilitate collaboration over the Internet, a substantial collection of technologies and protocols have been assembled to effectively deliver information in near real-time over the single data communications medium of the Internet. These technologies include several human-to-human collaborative environments such as instant messaging and persistent chat rooms.

Current messaging systems allow users to communicate through a mostly textual interface. In this regard, though individuals around the globe can communicate in near instantaneous fashion, much of the interaction if not the entire interaction must be limited to the textual words included in the message. As a result, it can be difficult to ascertain the full context of a conversation in a message where only the text of the message can be used to establish the context of the conversation.

The difficulties in understanding the context of a textual conversation can become compounded where the participants to a textual conversation hail from different geographic regions, cultures or even different nations. In particular, the colloquialisms associated with one culture or nationality cannot always translate well when expressed exclusively in a textual medium. For example, the phrase, "Top of the day" can be understood to one who hails from London, but not to one whose first language is not English. Accordingly, the use of colloquialisms in electronic messaging can impair clear communication.

SUMMARY OF THE INVENTION

The present invention addresses the deficiencies of the art in respect to messaging with colloquialisms and provides a novel and non-obvious method, system and apparatus for processing colloquialisms in message text. In this regard, a method of processing colloquialisms in message text can include detecting a colloquialism in message text, locating a universal form for the detected colloquialism, and transmitting the message text with the universal form to a designated message recipient. The transmitting step can include replacing the colloquialism with the universal form, and transmitting the message text with the universal form to a designated message recipient. Alternatively, the transmitting step can include supplementing the colloquialism with the universal form, and transmitting the message text with the universal form to a designated message recipient.

In a particular aspect of the invention, the supplementing step can include visually marking the colloquialism in the message and associating the marked colloquialism with the universal form. In this way, the universal form can be displayed when the marked colloquialism is selected by the designated message recipient, for instance through the use of a tool-tip. In any case, the transmitting step can include formatting the message with the universal form using a common message formatting schema and, transmitting the formatted message to a designated message recipient. Notably, the transmitting step can include formatting the message with the universal form as an instant message, or as an electronic mail message before transmitting the message to a designated recipient.

A system for processing colloquialisms in message text can include a colloquialism database and a colloquialism processor. The colloquialism processor can be configured for coupling to the colloquialism database and to a messaging client. Specifically, the colloquialism processor can include logic programmed to detect a colloquialism in message text and to locate a universal form for the detected colloquialism in the colloquialism database. Notably, the messaging client can be an instant messenger client. Also, the messaging client can be an electronic mail client. In either case, a common schema can be included for formatting messages processed by the colloquialism processor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for colloquial prose interpretation in a messaging session. In accordance with the present invention, colloquialisms identified within a message can be marked as such and each marked colloquialism can be translated to a universal form. Subsequently, the message can be transmitted to a message recipient where the message can include a universal form or a reference to a universal form for each marked colloquialism. Subsequently, upon receipt, the message can be rendered along with each universal form of the identified colloquialisms.

Figure 1:
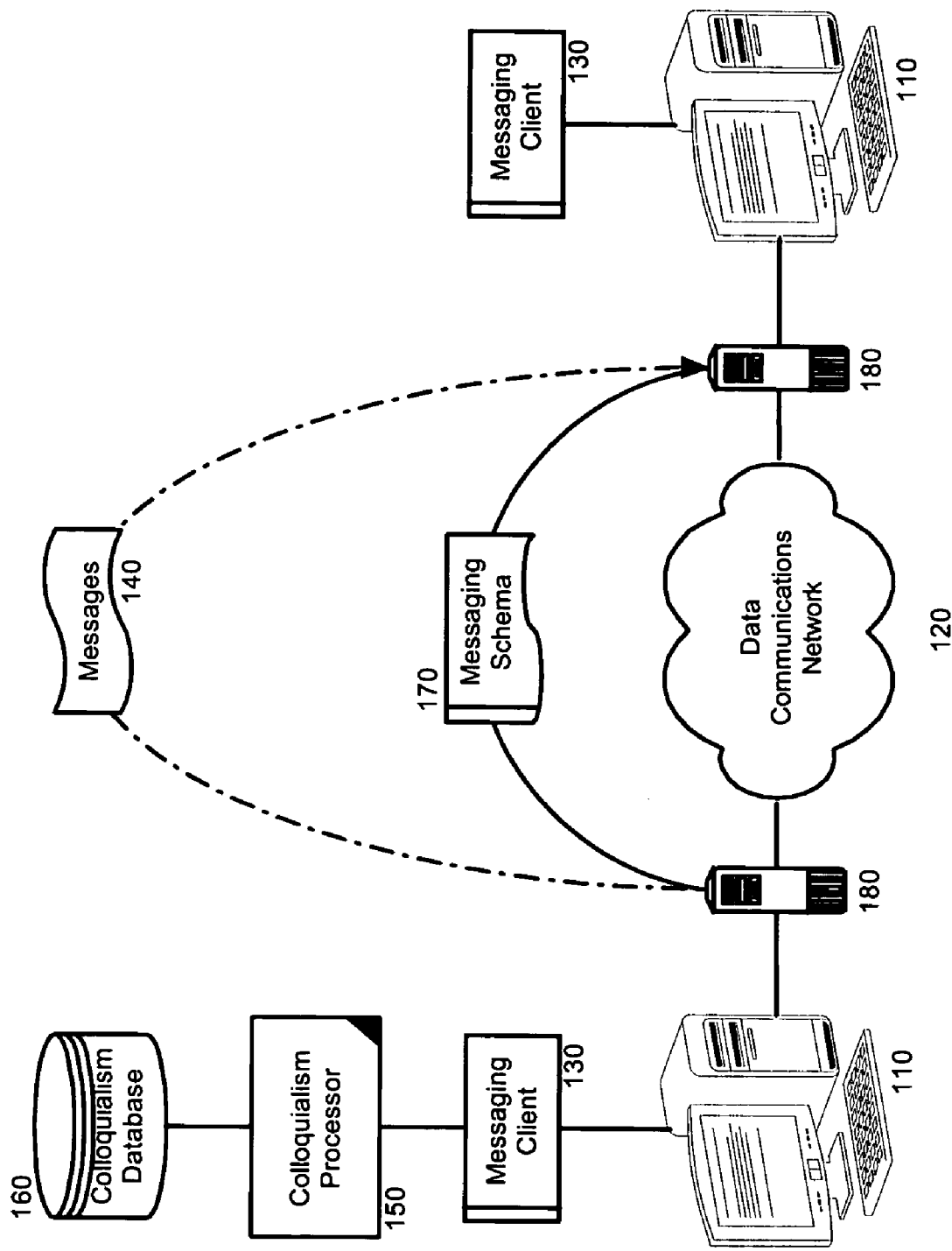
FIG. 1 is a schematic illustration of a system configured for colloquial prose interpretation in a messaging session; and, FIG. 2 is a flow chart illustrating a process for colloquial prose interpretation in a messaging session in the system of FIG. 1.

In further illustration of the present invention, FIG. 1 is a schematic illustration of a system configured for colloquial prose interpretation in a messaging session. The system can include one or more messaging systems 110 coupled to one another over a computer communications network 120. The messaging systems 110 can include a messaging client 130 communicatively linked to a messaging server 180 configured to process messages between the messaging systems 110. Optionally, the messaging server 180 can utilize a common messaging schema 170 to process messages 140 between the messaging systems 110.

In this regard, the messaging client 130 and the messaging server 180 can reside in the same platform, in different platforms over a private network, or in different platforms across a public network, or across a combination of both private and public networks. For example, the messaging client 130 and messaging server 180 can form the basis of an e-mail system where the messaging client 130 is an e-mail client and where the messaging server 180 is an e-mail server. As another example, the messaging client 130 and messaging server 180 can form the basis of an instant messaging system where the messaging client 130 is an instant messaging or chat client, and where the messaging server 180 is an instant messaging or chat server.

Importantly, a colloquium processor 150 can be coupled to the messaging client 130. The colloquium processor 150 can include logic to identify and mark colloquialisms within a composed message. To facilitate the identification of colloquialisms, a colloquialism database 160 of known colloquialisms can be communicatively linked to the colloquialism processor 150. In this regard, the colloquialism database 160 can include not only a set of colloquialisms, but also a translated, universal form of the colloquialisms such that when substituted for the colloquialisms, the universal forms can be understood by message recipients who lack an understanding of the colloquialisms of the message senders.

Figure 2:
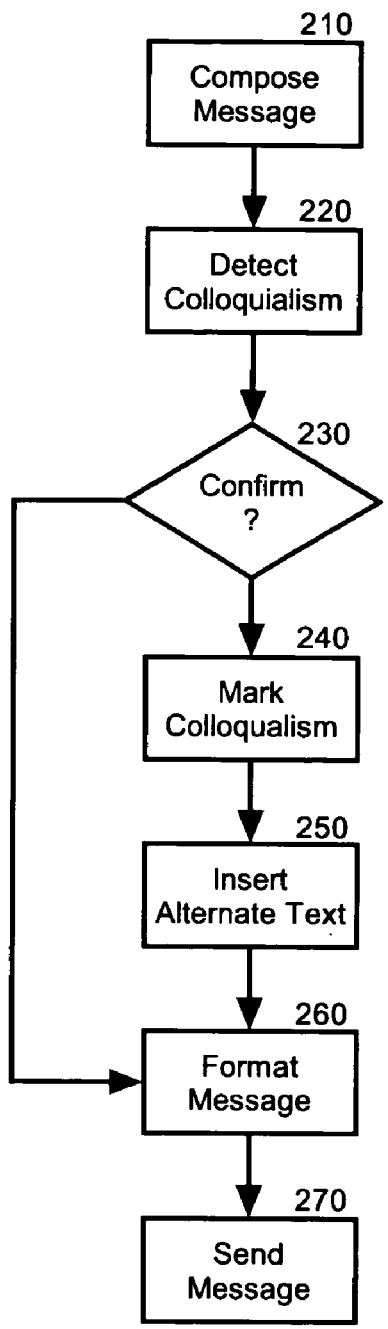

In more particular explanation, FIG. 2 is a flow chart illustrating a process for colloquial prose interpretation in a messaging session in the system of FIG. 1. Beginning in block 210, a message can be composed. Either during the composition process, or subsequent to the composition process, in block 220 one or more colloquialisms can be detected in the message. Responsive to detecting one or more colloquialisms in the message in block 220, in decision block 230, the composer optionally can be prompted to confirm that indeed the text associated with the detected colloquialisms are to be treated as such. In this regard, the messaging session can be pre-configured to prompt the composer when a colloquialism is detected, or the messaging session can be pre-configured to automatically handle colloquialisms without requiring an intermediate prompting step. In any case, if no colloquialisms are detected in decision block 230, the message can be formatted and transmitted normally in blocks 260 and 270. Otherwise, the process can proceed through block 240.

In block 240, each detected colloquialism can be marked, highlighted or otherwise denoted to indicate the presence of a colloquialism. Subsequently, in block 250 a universal form for the colloquialism can be determined and inserted into the message. For example, the colloquialism can be replaced with the universal form, or the universal form can be linked to the colloquialism so that when a colloquialism is selected, the universal form can be displayed such as in a tool-tip. In any case, in block 260 the message can be formatted according to the common schema utilized by the messaging system and the message can be transmitted in block 270.

Notably, the pre-processing of colloquial text in a message can assure that a recipient of the message can gain a clearer understanding of the content of the message without becoming subject to the impediment of colloquial text. Yet, the composer of a message need not lose the flexibility of colloquialism use. Rather, the present invention provides a range of actions which can be applied to detected colloquialisms including merely marking the colloquialisms and supplying a universal form of the colloquialism, to completely replacing the colloquialism with the universal form in the message.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method of processing colloquialisms in message text, the method comprising the steps of:

detecting a colloquialism in message text;

locating a universal form for said detected colloquialism;

visually marking said colloquialism in said message;

associating said marked colloquialism with said universal form;

transmitting said message text with said universal form to a designated message recipient, wherein said universal form is displayed when said marked colloquialism is selected by said designated message recipient.

2. A machine readable storage having stored thereon a computer program for processing colloquialisms in message text, the computer program comprising a routine set of instructions which when executed by a machine causes the machine to perform the steps of:

detecting a colloquialism in message text;

locating a universal form for said detected colloquialism;

visually marking said colloquialism in said message;

associating said marked colloquialism with said universal form; and transmitting said message text with said universal form to a designated message recipient, wherein said universal form is displayed when said marked colloquialism is selected by said designated message recipient.

* * * * *